Nov. 29, 1927.  
H. B. SMITH  
1,651,233  
MECHANISM AND METHOD FOR STRIP COVERING BOXES  
Filed Sept. 24, 1925 6 Sheets-Sheet 1

INVENTOR  
HARRY B. SMITH  
BY  
J. Granville Meyers  
ATTORNEY

INVENTOR
Harry B. Smith
BY
J. Granville Meyers
ATTORNEY

Nov. 29, 1927.  
H. B. SMITH  
1,651,233  
MECHANISM AND METHOD FOR STRIP COVERING BOXES  
Filed Sept. 24. 1925  
6 Sheets-Sheet 4

Inventor  
HARRY B. SMITH  
By Attorney  
J. Granville Meyers

Nov. 29, 1927. 1,651,233
H. B. SMITH
MECHANISM AND METHOD FOR STRIP COVERING BOXES
Filed Sept. 24, 1925    6 Sheets-Sheet 5
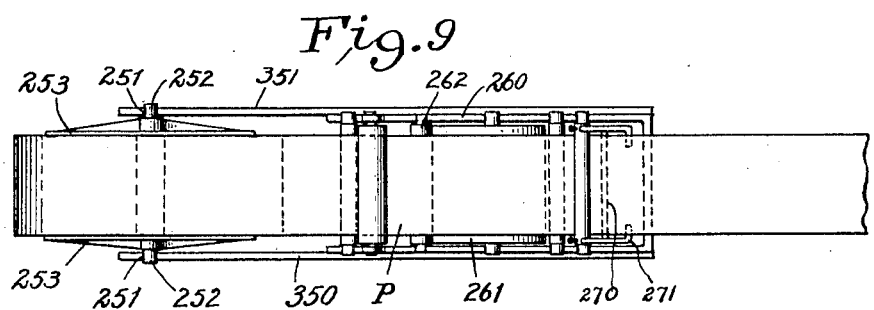
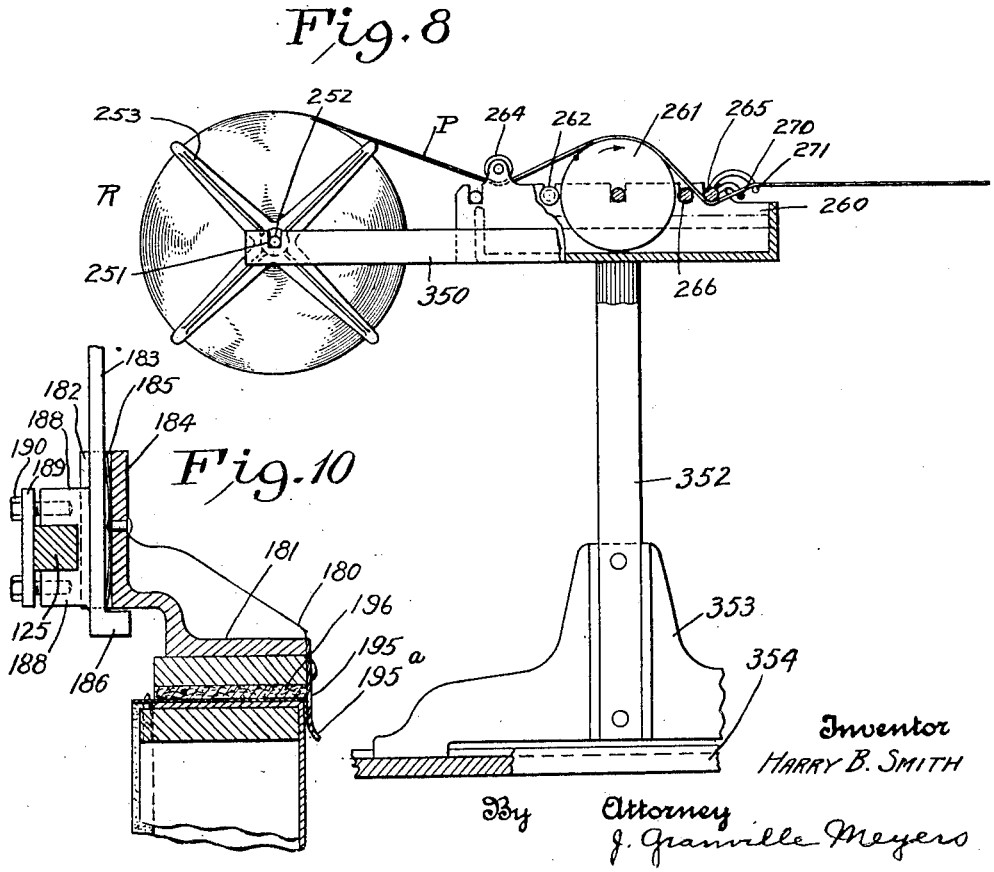
Inventor
HARRY B. SMITH
By Attorney
J. Granville Meyers Nov. 29, 1927.  
H. B. SMITH  
1,651,233  
MECHANISM AND METHOD FOR STRIP COVERING BOXES  
Filed Sept. 24, 1925  
6 Sheets-Sheet 6
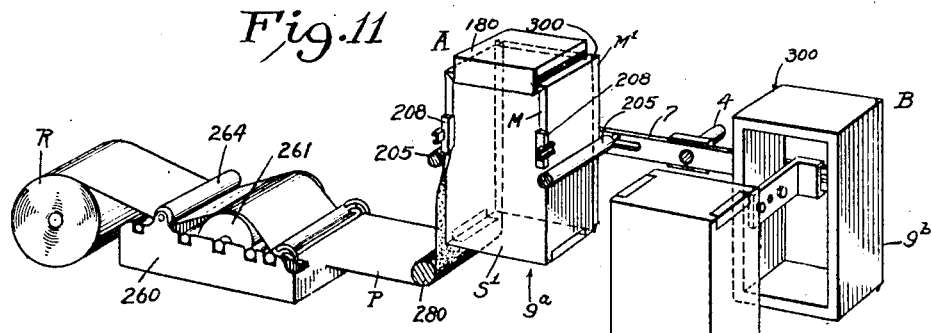
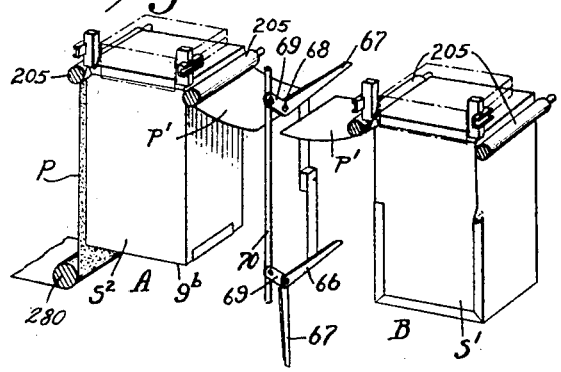
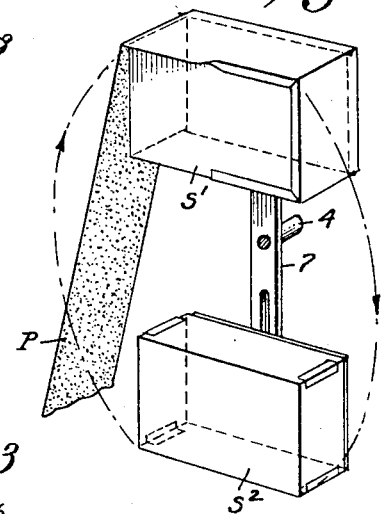
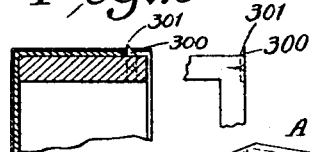
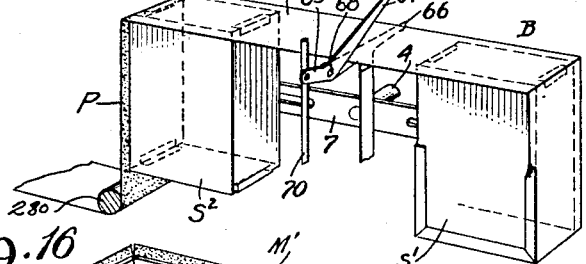
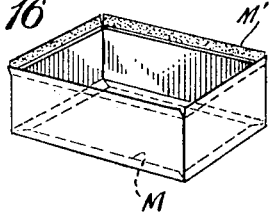
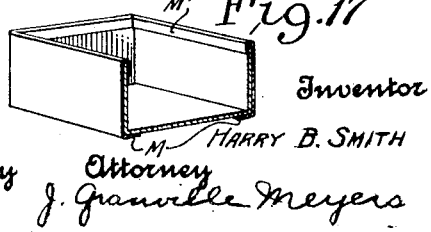
Inventor
HARRY B. SMITH
By J. Granville Meyers
Attorney Patented Nov. 29, 1927.

1,651,233

UNITED STATES PATENT OFFICE.

HARRY BRIDGMAN SMITH, OF NEW YORK, N. Y., ASSIGNOR TO BRIDGMAN & RUBIN, INC., OF NEW YORK, N. Y., A CORPORATION OF NEW YORK.

MECHANISM AND METHOD FOR STRIP-COVERING BOXES.

Application filed September 24, 1925. Serial No. 58,281.

My invention relates to mechanism for applying covering material in strip form to box shells, and to methods of covering boxes which may be performed by the present mechanism or otherwise.

For this general method of covering boxes, covering paper is drawn from a roll and applied over the side walls of a box shell, which is usually rectangular, with margins projecting beyond the bottom and open edges of the shell. These margins are then turned and secured on marginal parts of the shell bottom and inner marginal parts of the walls, respectively.

A general object of this invention is to provide a machine which is largely automatic in its action, and is in fact entirely automatic, except for the services of an attendant to place the box shells on a form, and except for one margin turning and affixing operation, and at the same time to provide a relatively simple and inexpensive machine and one which can easily be adjusted by comparatively unskilled labor for different box sizes. The machine is thus especially well adapted for relatively short runs of different sized boxes, as it is relatively easy to adjust or set up the machine for a particular size of box or shell.

A further, more particular object is to provide mechanism including two shell supporting forms which are moved in a fixed circuit or about a common fixed center. In so moving they draw a cover strip in continuous, web form from a roll, and cause it to be applied to successive outward faces of the two box shells with a portion of the continuous web extending across the space between two aligned faces of the shells. This intermediate part of the web is then severed between the shells to provide cover portions for application to inner or confronting faces of the shells; the cover paper is then wiped or smoothed down upon certain parts of the box walls by operations performed substantially simultaneously. The plan of operations is such that substantially one-half of the box shell at each station is "finished" or covered by simultaneous operations, and the half-finished box at one station is transferred to the other station, and the operations then performed upon the half finished box at the last named station result in completing the covering of that box, which is then ejected or removed and another uncovered shell positioned for movement to the first station; and these operations continue indefinitely.

A further object is to provide means, in connection with other essential features, for automatically turning and securing one projecting cover margin, for instance, the bottom margin, and securing it to the shell bottom surface, and also to provide means for ejecting or discharging the shell in completely covered form, except that the other projecting cover margin, namely at the open end of the shell, is left in condition for turning and securing by hand or otherwise.

As to the method forming a part of the invention, the general object is to provide a method or process of strip-covering box shells, which may be carried out with the present mechanism or in other ways.

The characteristics and advantages of the invention are more particularly explained in connection with the following detail description of the accompanying drawings, which illustrate one exemplifying embodiment of the invention, and also explain one representative performance of the process. After considering these examples, skilled persons will understand that many variations may be made within the principles of the invention, and I contemplate the employment of any modifications or variations that are properly within the scope of the appended claims.

In the drawings:

Fig. 8 is a side elevation matching Fig. 1, of one suitable gluing mechanism, with some parts in section.

Fig. 9 is a top plan view of the same.

Fig. 10 is an enlarged section of the pressing bar with one of the strip pressing and margin turning devices.

Figs. 11 to 14 are explanatory or positional views useful mainly for an understanding of the process.

Fig. 15 is a sectional detail of a part of one of the forms and a cover margin slitting device, in two positions.

Fig. 16 shows the box shell completely covered except for the upstanding open-end cover margin, which is slit, ready for folding.

Fig. 17 is a view of one-half of a completed, covered shell, in sectional perspective.

Figure 1:
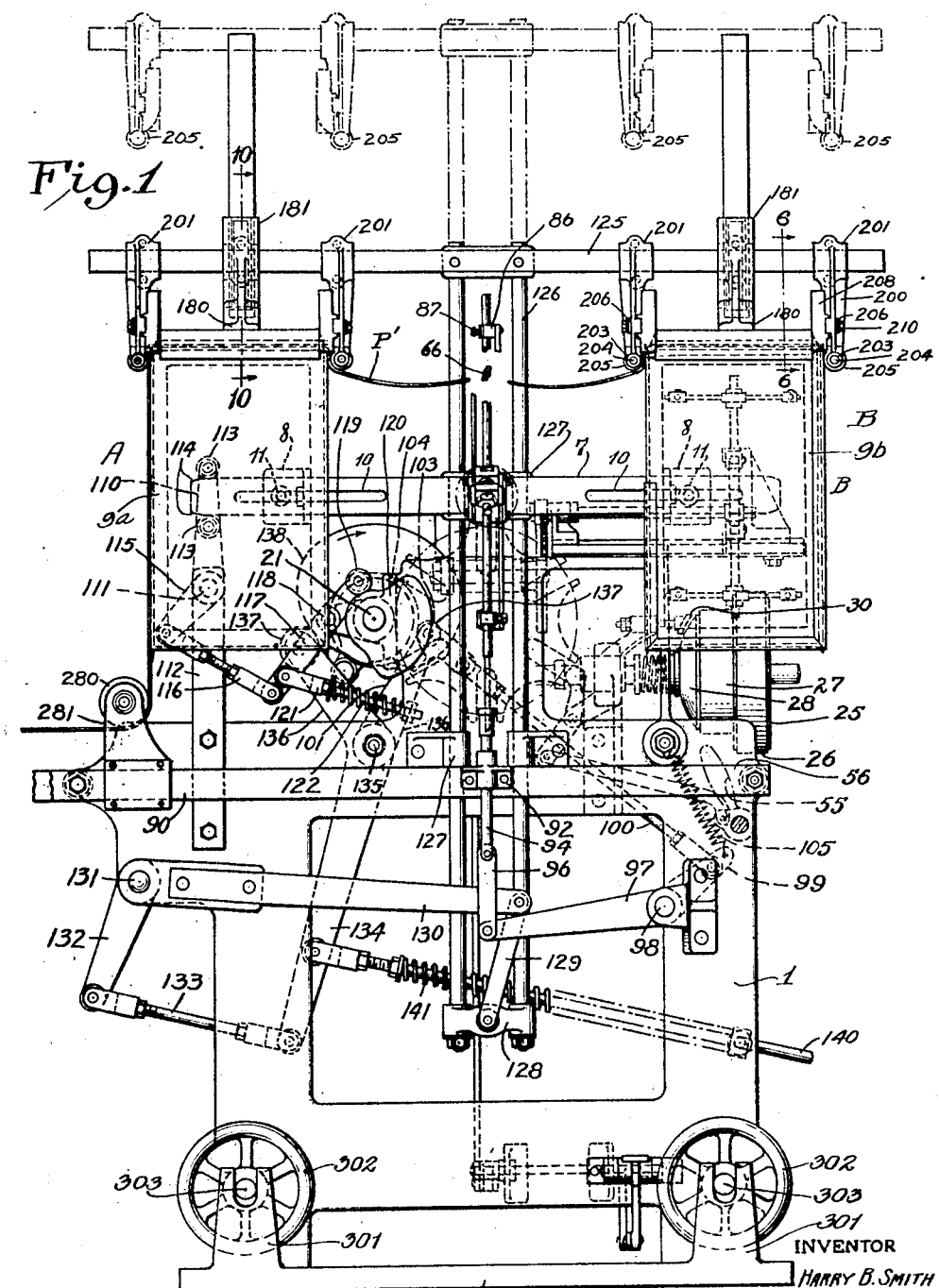
Fig. 1 is a front elevation of a machine embodying the invention in one form.

In the form chosen for illustration the machine is built upon or around a frame which includes a front upright 1, a rear upright 2, and various horizontal connections such as 3. To provide for regulating the application of a cover web to box shells carried by forms, as described hereafter, an adjustment is provided, and conveniently this adjustment consists in moving the entire machine slightly, angularly, or to and fro. For this purpose the frame members 1 and 2 are slidably set on a base 300 which has at the front, brackets 301 in which nuts 302 in the form of hand wheels are mounted on screws 303 fixedly extending from the front frame member 1. By turning the hand nuts the machine may be moved slightly, either angularly or forward and back (toward or from the observer in Fig. 1) for adjusting the line of web movement as further explained hereafter.

A horizontal shaft 4 is mounted for rotation in fixed bearings 5 on frame members 1 and 2. At its forward, projecting end the shaft has a hub or fitting 6 in which is secured at its center a form support, which may otherwise be identified as a turning bar, 7. Near each end the bar supports, by means of a bracket 8, forms $9^a$ and $9^b$ each of which consists of four sides or walls usually in rectangular arrangement to conform to the usual shape of the box shells. Different forms are provided for shells of different dimensions within the reasonable range of box sizes for any particular machine. Preferably the forms are adjustable longitudinally of the bar to properly position shells of different widths. For this purpose the bar is provided with slots 10, and the brackets 8 have bolts 11 passing through the slots, so that the forms may be securely clamped in adjusted positions.

Figure 5:
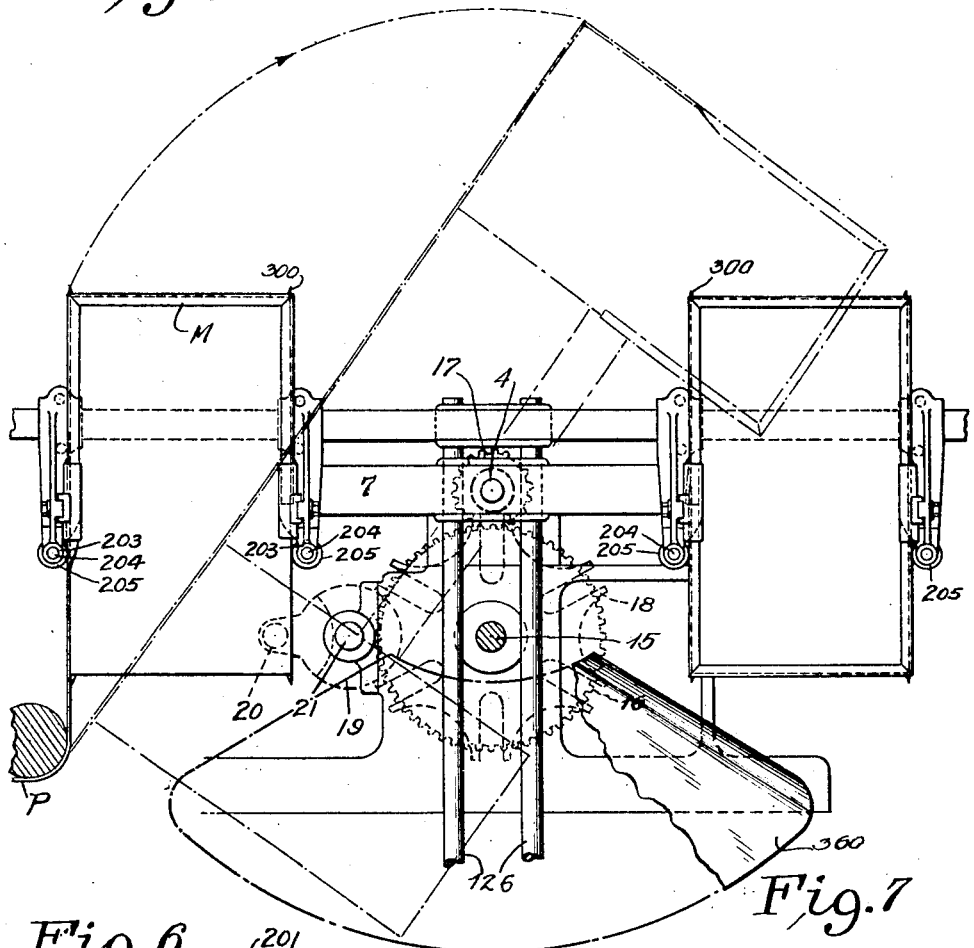
Fig. 5 is an explanatory or positional front elevation, enlarged, with many parts omitted.

The turning bar shaft 4 may be driven in various ways. It is usually desired to drive it intermittently, with a pause which includes the greater part of the cycle time, for the purpose of performing pressing, folding, and other operations at fixed stations designated A and B in certain figures (see Fig. 1). For this purpose a countershaft 15, Fig. 5, is mounted in bearings below shaft 4, and is provided with a gear 16 engaging a pinion 17 on shaft 4. Shaft 15 also carries a Geneva wheel 18 to cooperate with a locking disk 19 and driving stud 20 on an adjacent cam shaft 21. Shaft 21 has a worm wheel 22 driven by a worm 23 on a rear shaft 24. This shaft has a loose pulley 25, which is the initial driving member of the machine and is driven in any convenient way, for example by a belt 26 from a line shaft. The pulley has a clutch member 27 releasably engaged by a clutch cone 28 which is splined on shaft 24 and urged to engagement by a spring 29. Adjacent the outer face of the cone is a yieldable, friction clutch 30. The clutch is controlled by a shifter bar 31, which has a fork 32 engaging an annular shifting channel on the clutch member. This bar is mounted for reciprocation in fixed sleeves, and near one end has secured upon it a flanged collar 33. A cam 34 is connected to reciprocate vertically against the flanges of collar 33 by pin and slot connections 35. The vertical edge of the cam is engaged by a stud 36 on one arm of a bell crank 38 fulcrumed at 39 on a fixed frame arm 40. The other arm of the bell crank has a cam roller 41 engaging the periphery of a cam 42 fixed on shaft 21. Cam 34 is connected by a link 45, bell crank 46 and link 47 to an arm 48 of a pedal lever 49 fulcrumed at 50 and normally supported in elevated position by a spring 51.

Figure 4:
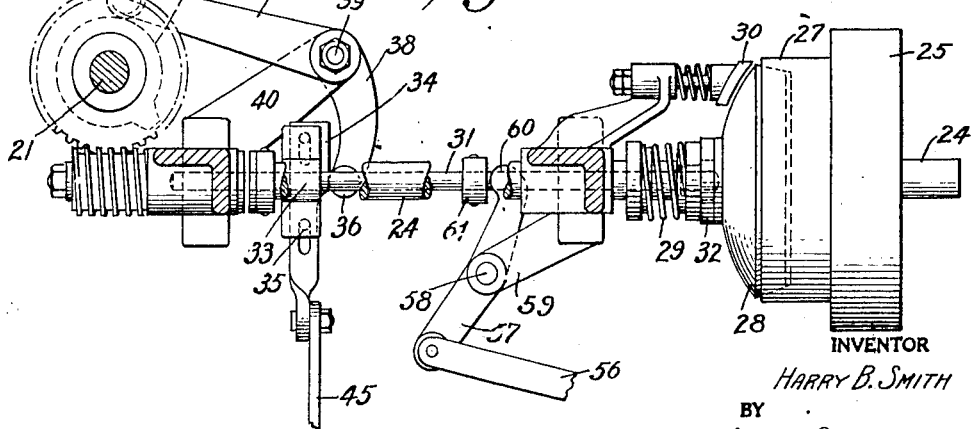
Fig. 4 is a sectional detail, enlarged, at 4—4 Fig. 3, showing the clutch mechanism and certain other features.

As explained more fully hereafter, substantially one-half of the covering operations for each of two box shells are performed at each of stations A and B, and these operations always complete at station B the covering of a shell which has already been half covered at station A; the operative cycle of the machine therefore corresponds to a half-turn of shaft 4 and its turning bar, which brings a half-completed shell from station A to station B; the covering operations are then simultaneously performed at the two stations resulting in the completion of the box at station B (so far as the operations of the present machine are concerned) and then the covered box is ejected or pushed off of the form and another, uncovered, shell is placed on the form by the attendant or by mechanism which is not a part of this invention. The driving ratio from shaft 24 to shaft 4, including the arrangement of the Geneva mechanism, is therefore such that one turn of the primary drive shaft 21 produces one-half turn of the turning bar. At the beginning of the cycle, with clutch 28 engaged, shaft 24 is driven, and drives shaft 21 through the worm gearing. In the first part of this movement the locking sector 19 is moved away from the corresponding locking socket of the Geneva wheel 18, and the driving stud 20 is brought into the next adjacent radial slot of the wheel, and the wheel is turned one-sixth revolution (corresponding to the number of turning slots in the wheel, as shown). The gears 16 and 17 are proportioned so that this movement turns the turning-bar one-half revolution. Thereupon the locking sector 19 enters the next locking formation of the Geneva wheel and the turning bar is held stationary with the forms and the box shells thereon ready for cover-folding or turning, wiping and pressing operations. A positive registering device is preferably employed to more definitely locate the turning bar as described presently. The continued rotation of cam shaft 21 now provides motive power for the described covering operations, as also explained below, and after completion of such operations the lobe of cam 42 approaches cam roller 41 and moves bell crank 38 so that stud 36 acting on the upper enlargement of cam 34 moves the shifter rod 31 to the left (as viewed in Fig. 4) and releases clutch member 28 from its driver and brings the clutch member in contact with the friction brake 30 so that all the driven parts from primary shaft 24 on, are promptly brought to rest with cam roller 41 standing on the crest of the lobe of cam 42. Just before this the finished box was ejected from the form at station B and the automatic stoppage of the machine is provided mainly to be sure that the attendant will have sufficient time to properly place another uncovered shell on the form at this station. Having done so she steps on pedal 49, and through the described linkage cam 34 is moved upward, whereupon the wide part of cam 34 is removed from engagement with stud 36, and the cam with its collar 33 and the shifter rod 31 are moved to the right by the action of clutch spring 29, which simultaneously engages the clutch, and driving of shaft 24 is recommenced, initiating a new cycle, in the first part of which the turning-bar is rotated one-half turn, and so on. In some cases, if the arrangement of the machine or the skill of the operator is such that no pause is required, the automatic stop may be omitted, or the operator may maintain the pedal 49 in depressed position, or it may be held down, in any other way.

Arbitrary stop mechanism is also desirably provided for stopping the machine at any moment or in any position. This comprises a handle 55 pivotally mounted at a point convenient to the operator and connected by a link 56 to a lever 57 pivoted at 58 to a fixed frame arm 59. The lever has a forked end 60 engaging a collar 61 on shifter rod 31. Handle 55 and the adjacent end of link 56 are arranged to have a toggle action so that when the handle is moved outward, the described linkage acts to withdraw the clutch and is held in that position until the handle is again moved back to the position shown in Fig. 1.

The plan of operations is such that a web of cover paper P is drawn from a roll B, glued and applied to a face of a box shell at station A, and in each half rotation of the turning bar a portion $P^1$ of this web is drawn across the space between the upper faces of the two box shells and must be severed at a convenient point which may be, as shown, mid-way between the shells, but may be at any other convenient point. When this web portion is not severed centrally the flaps produced by severing will be of different lengths, or in other words, one relatively short flap will be produced which covers less than half of the inward face of one shell, while the other, longer flap, will cover more than half the inward face of the other shell. For brevity in following description it will be assumed that this web portion is cut centrally, but reference to this (especially in the claims) is not to be taken as a positive limitation, but is intended to apply to other ways of severing and affixing the flaps produced by this operation. For this purpose an extension of the turning-bar hub fitting 6 adjustably supports vertical cutter bars 65, at one end of each of which is a fixed cutter blade 66 located so that the cutting edge of the upper blade is close to the cover web $P^1$. A movable blade 67 is pivotally connected at 68 to a forward extension of each fixed blade. The movable blades have short arms 69 pivotally connected together by a vertical connecting rod or link 70, and the arms 69 are at such angles to the blades 67 that when the rod 70 is moved in one direction (which is always upward when the cutting action is performed) the upper movable blade is brought down and cuts the web against the fixed blade 66, while simultaneously the lower movable blade is moved down to vertical position, so that it will clear the web when the turning-bar is next rotated. Then at the next cutting action the rod or link 70 is moved in the opposite direction with reference to itself, but upward in relation to the machine, to perform the next cutting action, and so on.

To simplify the operation of the cutting mechanism, which rotates the turning-bar and forms, by relatively fixed means, an overthrow and detent device is provided as follows: Fixed parallel arms 75 extending from the turning-bar hub support short toggle links 70 which are pivoted to a block 77 fixed at the mid-point of the cutter connecting links 70. Also pivoted to this block is a toggle stem 78 running through a block 79 pivoted between the fixed supports 75. A spring 80 is compressed between block 79 and block 77. By this arrangement whenever the link 70 is moved past dead center positions, the toggle and spring mechanism throw it to the end of its travel in the same direction and so hold it until it is again moved.

To provide for adjustment of the cutting devices to correspond with different vertical box dimensions, the supporting bar 65 of the fixed cutters may be centrally divided and the parts held by clamping mechanism 85; and blocks 86 which connect the movable cutter blade arm 69 to rod 70, may be movably mounted on the rod and secured in adjusted position by set screws 87. Fig. 1.

To move the cutter connecting rod 70, a relatively stationary operating mechanism is provided, as follows: A horizontal frame member 90 is secured to frame upright 1 by horizontal struts 91. On frame member 90 is a bracket 92 having a sleeve 93 in which a plunger 94 is arranged to reciprocate vertically in line with rod 70 whenever the turning-bar is in fixed position. Plunger 94 has a head 95 of an area sufficient to insure proper contact with the lower end of rod 70. The plunger is connected by a link 96 to an arm 97 fixed on a horizontal shaft 98, which has another arm 99 connected to a link 100, the other end of which is connected to a lever 101 fulcrumed on a horizontal frame member 102. The lever has a cam roller 103 bearing on the periphery of a cam 104 fixed on cam shaft 21. The roller is held against the cam, and all other parts are held in retracted or inactive position by a spring 105, stretched between arm 99 and a fixed point on the frame.

At the proper time in the cycle, which is shortly after the turning-bar has come to rest, a rise on cam 104 strikes the cam roller and through the described linkage raises plunger 94, whose head encounters the lower end of rod 70 which is at that time in depressed position, and raises the rod until the spring and toggle mechanism completes the movement of the movable cutter blades as previously described, to cut the web P¹ and retract the lower blade 67. The plunger is then, by further movement of the cam, retracted to its lower or inactive position.

The registering or locking mechanism for the turning-bar comprises the following: A registering lever 110 is pivoted at 111 on a fixed frame upright 112. This lever has rolls 113 spaced apart to fit the vertical dimension of the turning-bar 7. The ends of the turning-bar are slightly beveled or tapered as at 114 to easily pass between the rollers as the lever is moved inward, (toward the right in Fig. 1). The lever has an arm 115 connected by a link 116 to another lever 117 fulcrumed at 118 and having a cam roller 119 running on the periphery of the cam 120 secured on the forward end of the cam shaft. Lever 117 is acted upon by a link 121 and spring 122 to hold the cam roller on the cam and also through the linkage to urge lever 110 with its rollers to active or bar-locking and registering position, as shown in Fig. 1. After all other operations of a cycle, namely, the web-cutting and covering operations which must be performed while the turning-bar is stationary, have been performed by mechanism driven by the rotating cam shaft 21, and just before the cam shaft is brought to rest by the automatic stop action above described, the enlarged lobe of cam 120 acts on the cam roller, lever 117 and linkage, against spring 122, to retract locking lever 110 (toward the left in Fig. 1), whereupon the turning-bar is free to move. At the completion of its movement, as an end of the bar approaches horizontal position, the enlarged lobe of cam 120 passes away from the cam roller and spring 122 acts through the linkage to move lever 110 toward active position. As the bar is brought to rest by its Geneva driving mechanism, the rollers 113 pass respectively above and below the tapered end of the bar and then come in engagement with the normal upper and lower faces of the bar without any considerable clearance, and therefore accurately center or register the bar and hold it firmly locked until the end of the cycle. This registering and locking mechanism may be dispensed with in some cases, but it is desirable because there is usually some play or back lash in the driving mechanism; also because folding devices which act on the stationary shells have to be quite accurately adjusted and it is therefore desirable to very accurately position the turning-bar and forms.

Various devices are provided to operate on the cover paper while the forms are in fixed position at stations A and B. These devices, fully described hereafter, are carried by a horizontal bar 125 which may be identified for convenience and without limiting significance as a presser bar. This is arranged to reciprocate vertically and for that purpose is carried by parallel vertical rods 126 which move in fixed sleeves 127. At their lower ends these rods are connected to a head 128 which is in turn connected by a link 129 to a lever 130 fulcrumed at 131 and provided with an arm 132, connected by a link 133 to another lever 134 fulcrumed at 135. An upper arm 136 of lever 134 has a cam roller 137 bearing on the periphery of a cam 138 fixed on cam shaft 21. Lever 134 is acted on by a spring rod 140 and spring 141 will hold the cam roller 137 on the cam and the spring also acts to move rods 126 and bar 125 downward so that the active movement of the bar and the paper manipulating devices carried by it is affected by a spring action. The cam 138 is centered and fixed on its shaft so that after the turning-bar has been horizontally positioned and locked and the web P¹ has been cut, the lobe of the cam passes away from the cam roller and spring 141 moves bar 125 down and the devices thereon act upon the cover paper in ways to be described. Thereafter the cam lobe acts on its cam roller to move the linkage in the reverse direction against spring 141 and raise rolls 126 and the presser bar 125 to upward position as indicated in Fig. 1, where they are well clear of the forms. Adjustment of this mechanism could be provided to suit different vertical box dimensions, but preferably this is avoided by providing sufficient stroke for the presser bar so that ample clearance is afforded for boxes having the greatest vertical dimension within the size range of the machine.

Figure 2:
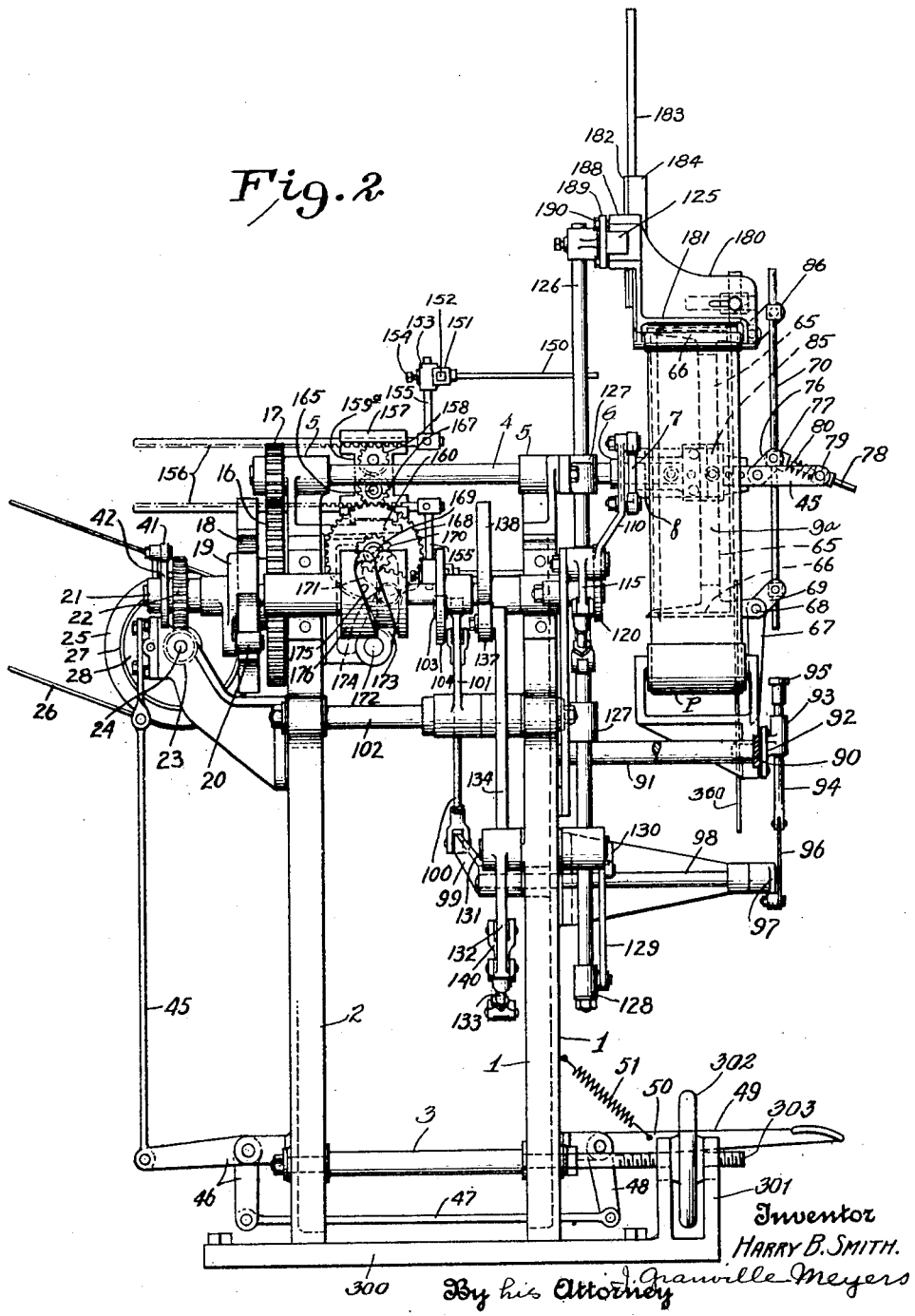
Fig. 2 is a left side elevation.
Figure 3:
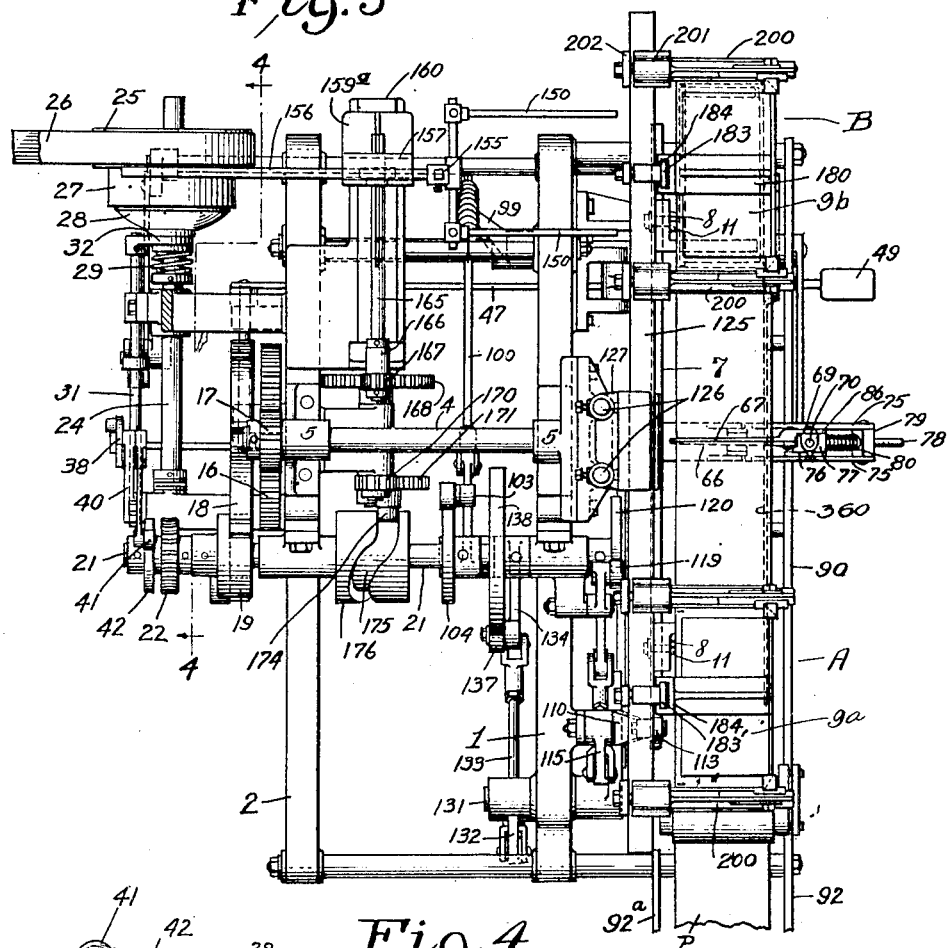
Fig. 3 is a top plan.

Ejector mechanism is provided, operative at station B, to eject the finished or substantially finished boxes. This comprises upper and lower pairs of ejector rods 150. Each rod is carried by a head 151 arranged for horizontal adjustment on a horizontal bar 152. The bars 152 are in turn carried by blocks 153 arranged for vertical adjustment and locking by means of set screws 154 on vertical rods 155. In this way the rods may be positioned both laterally and vertically for boxes of different dimensions. Desirably, the rods are positioned so that they encounter the inner face of the shell bottom at points relatively near the form walls. The vertical rods 155 are secured to horizontal bars or plungers 156 mounted in fixed slide-ways 157. The bars 156 are cut on their confronting faces with rack teeth, and these racks are engaged by connected pinions 158 rotatably mounted in a frame part 159ª which carries the slide-ways 157. This frame member 159ª is mounted for horizontal movement in locking on a horizontal frame member 160 so that the entire ejector unit may be moved horizontally in accordance with the horizontal positioning of the form on the turning bar. The lower pinion 158 is slidably mounted with a spline connection on a horizontal shaft 165, one end of which is supported in a bearing in the sliding frame 159ª and the other end in a fixed bearing 166. Adjacent the latter, shaft 165 has a pinion 167 engaging a gear 168 on a counter-shaft 169. This counter-shaft also has a pinion 170 engaging a gear sector 171 mounted on a rock-shaft 172. This shaft also has an arm 173 provided with a roller stud 174 engaging in a cam track 175 of a cam body 176 fixed on cam shaft 21. The cam track is contoured so that after the other operations of the cycle, and especially after the retreat of presser bar 125, rock shaft 172 is oscillated and the gearing is driven in an obvious way to project the ejector rods 150 forward (to the right in Fig. 2). Normally the forward ends of the rod are retracted as shown in Fig. 2, so that they are clear of the turning-bar or any other parts of the mechanism, or, in other words, do not interfere with free rotation thereof. The rods move forward into the form and strike the bottom of the box shell and push the shell off of the form to be caught by the attendant or to be received by a table (not shown). Since the outer faces of the forms of and the bottoms of the box shells are always in the same plane, regardless of the depth of the box, the ejector rods may have always the same stroke and do not require lengthwise adjustment.

The pressing, folding and wiping devices carried by a bar 125 are in duplicate for the two stations. Thus, for each station there is a pressing head 180 carried by a central bracket 181 which has gibs 182 slidably engaging a vertical carrier bar 183. The gibs 182 are formed on a bracket member 184 with clearance to allow for the insertion of a flat spring 185 between the member 184 and the outer face of the carrier bar 183. This provides in one representative way for a friction pressure exerted on the pressing head 180, as the supporting bar 183 moves downward, but the friction effect is not sufficient to prevent downward movement of the head 180 and its bracket by gravity, as bar 183 moves upward. The bar has a stop 186 to engage with an under portion of the bracket and lift the head 180 at the proper time in the upward movement of bar 183. The bar 183 has lugs 188 straddling the horizontal pressure bar 125 and a clamp 189 is secured to these lugs by screws 190. By this arrangement the entire presser unit may be moved and secured in horizontally adjusted position on the presser bar 125 to properly center the pressing head in any of the horizontal adjustments of the form. The pressing head comprises a wooden block (or it may be of metal if greater weight is desired) somewhat shorter than the length of the upper end of the form (and, of course, properly dimensioned heads will be provided for the different form-end dimensions). The head has a vertical front flange 195 with a flared or beveled lower edge 195ª. A felt or other compressible pad 196 is secured to the under face of the head. The pad engages and presses the main horizontal web of cover paper on the upper end of the box shell, and flange 195ª turns down and presses the long central portion of the projecting bottom cover margin (after the inner side wall portion of the severed web P¹ has been turned down and positioned, as later explained) against a margin of the shell bottom, leaving small end portions of these margins projecting and connected to the vertical projecting margins, which are to be turned in and wiped or pressed down in contact with the side shell bottom margins by devices now to be described.

Figure 6:
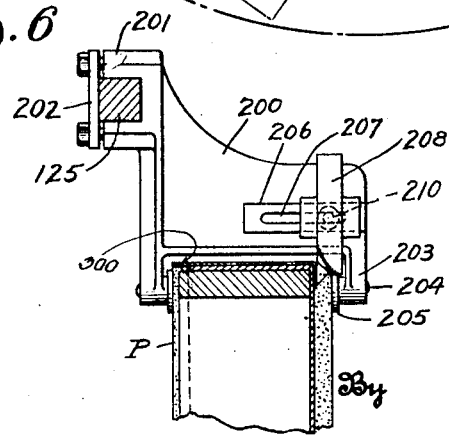
Fig. 6 is a sectional detail, enlarged, of the presser bar and certain associated parts.
Figure 7:
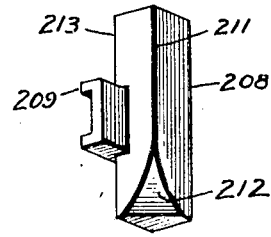
Fig. 7 is a detail in perspective of a cover margin or lap folder.

Also at each of the stations cover-wiping or rolling and margin-turning devices are carried by the presser bar 125, one at each side of the pressing head 180. Each of these devices comprises a body or frame 200 having a lug and clamp arrangement 201, 202, similar to the devices 188, 189, etc., described in connection with bracket 181, by means of which the frames 200 may be adjusted laterally and secured in position on bar 125 for proper cooperation with boxes of different widths and also in accordance with the lateral adjustment of the forms. Each frame 200 carries a suitable device for smoothing and pressing down the cover paper on the vertical faces of the shell. Specifically, in the present case each frame has at its lower edge lugs 203 providing bearings for a shaft 204 on which is mounted a pressing roll 205 (which might otherwise be a rotary or fixed brush, or a pad) to wipe down and press the cover paper on the vertical sides of the shell. Each of the frames 200 also has a horizontal guide 206 provided with a slot 207. A margin-turning and pressing device 208 has formations 209 to slidingly engage the guide 206, and a screw 210 passes through slot 207 to secure the presser 208 in adjusted position. The turning or pressing member 208 is usually of rectangular section and at the lower end of one corner 211 it has a curved or beveled face 212 so arranged that as the device moves downward it reaches the position shown in Fig. 6, adjacent the projecting cover bottom side margin, and then in further downward movement the beveled face 212 turns the margin inward against the bottom of the shell and the vertical flat face 213 then presses the margin in position. The adjustment referred to is for the purpose of properly locating the turning and pressing device 208 so that it will properly turn and press the cover margin. The rolls 205 may be long enough to properly press cover paper on boxes of the greatest depth within a reasonable range of the machine, and will, of course, equally well act on shallower box parts.

It is desirable to provide means for supporting a roll of cover paper in proper relation to the machine, and also to provide suitable mechanism for applying adhesive to one face of the advancing cover web. For this purpose horizontal frame members 350 and 351 (Figs. 8 and 9) are provided, and supported by uprights 352 which are mounted in feet or pedestals 353 arranged to aline on channeled tracks 354 extending in line with the front part of the main machine, or so as to substantially aline the web roll and gluing mechanism, now to be described, with the forms carried by the turning-bar. The frame members 350 and 351 have sockets 251 to receive a spindle 252 supporting a spider 253 which in turn properly supports and guides the roll R of cover paper. Between the paper roll and the main machine, gluing mechanism is located. This comprises a glue trough 260 with a main glue roll 261 mounted in bearings in its side walls. A regulating roll 262 sometimes called a "doctor" roll is mounted to rotate close to roll 261, either in contact with it, or with slight clearance, to regulate the amount of glue carried up by the main roll for application to the paper. The web P is led under a guide roll 264, then over the main glue roll and under another guide roll 265. Between the main glue roll and the guide roll 265 is a roll 266 to support slack that may be produced in the web at times due to the intermittently pulling action of the forms 9ª and 9ᵇ, and prevent the paper sagging into the glue in the trough. Mounted on the guide 265 or near it are scraping devices, one of which consists of a rod 270 extending entirely across the web in contact with its lower face. This tends to remove the superfluous glue and to equalize distribution of glue on the under face of the web. In some cases this may be omitted. Other scrapers 271 are relatively short and are provided to remove superfluous glue along one or both of the web margins. The margin which is lowermost in Figure 9, or nearest the observer in Figure 8, is a margin which will project at the bottom of the box shell and is to be turned in quickly. The other margin will project at the open end of the shell and in the present embodiment of the invention provision is not made for automatically turning in and securing this margin, but this is to be done after ejection of an otherwise completely covered shell from the form, either by hand labor or any suitable machine. Usually, therefore, it is desirable to leave more glue on the last mentioned margin than on the first one and the scrapers 271 may be adjusted to produce this result, or one of them may be omitted. The margin scrapers are also provided because in some cases it is desirable to leave more glue on the central zone of the web to insure proper adhesion to the box shell, and the margin scraping operation will, therefore, permit adequate glue to be applied to the central zone and any excess to be removed from one or both margins.

A guide roll 280 is mounted in bearings in adjustable brackets 281 near the left hand form when it is in stationary position, as viewed in Fig. 1, usually nearly vertically under the left hand vertical face of the form, and also located to provide clearance for rotary movement of the largest form which will be used in the machine.

The tracks 354 above mentioned, on which the gluing mechanism and web roll are mounted, extend a very considerable distance (several feet) to the left of the main machine, as viewed in Fig. 1. This adjustable mounting is important because it provides for the proper tempering of the glue under different weather conditions or for other reasons. This is done by regulating the length of the glued web passing to the main machine, by sliding the entire gluing mechanism on the tracks toward or from the main machine. This regulation may be made in accordance with the kind of adhesive, or more particularly, in accordance with the atmospheric moisture conditions. For instance, on a dry day when the glue will dry or temper quite quickly, the gluing mechanism is moved relatively near to the machine, and on a moist day when the glue dries or tempers more slowly, the gluing mechanism is moved farther away.

The adjustment of the main machine on its base 300 is provided so that the web may be caused to run straight and true on to the forms with proper preservation of the marginal projection at the front and rear of the forms or shells. The machine may be moved bodily to and fro to bring it in the proper line of web advance and regulate the margins, and if the web does not then run true or straight onto the shells, it may be properly regulated by moving the machine angularly, all this by manipulation of the hand wheel nuts 302.

When the cover web has been applied around the entire periphery of a box shell the margin projecting at the open end will be continuous, and to facilitate its subsequent turning and pressing on inner margins of the shell walls by hand operations or otherwise, an important feature of the invention is to provide means for automatically slitting this projecting margin at the corners to avoid the necessity for making tuck folds when the margins are turned in. For this purpose margin cutters or slitters 300 are desirably fixed on the forms near the corners thereof. Each of these slitters consists of a thin blade having a beveled knife edge 301 detachably held by a screw so that it can be easily removed for sharpening when necessary.

When the cover paper is applied the points of these cutters prick through the open-end margin at the corners thereof, as best shown in Fig. 15, and then when the shell is pushed off of the form, the cutting edges slit through the cover margin and separate it into four independent flaps which may be easily turned and pressed against inner margins of the shell walls, smooth and flat, and without tuck folds. These cutters, or especially their pricking points, serve to or aid in retaining the shell on the form as it moves from station A to station B. When the cover paper is wrapped around the shell the points of the cutters prick through the inner or open end marginal projections of the cover, which is in turn adhesively affixed to the shell and thus the shell is held in place. Any suitable means may be provided when necessary for retaining the shells on the form going from station B to station A; such as a guard plate or retaining plate 360 supported by a convenient fixed frame member. This is usually unnecessary in the case of deep shells, such as deep box bodies, but may be provided for shallower box bodies or covers.

The operation of the machine will be sufficiently understood from preceding description supplemented by the following brief description of one representative performance of the process which forms a part of the invention, and which can, of course, be performed by the operations of the described machine; but it is also to be understood that the process may be performed in other ways or by other machines. For example, it may be performed largely by hand operations aided by simple or rudimentary appliances, and the appliances indicated in a more or less diagrammatic way in Figs. 11 to 17 inclusive, may be taken as representative of such simple appliances which may be used in carrying out the process.

Fig. 11 will explain the beginning of a "run". A box shell $S^1$ has been placed on the form $9^a$ at station A. The cover web P properly glued on its under face has been brought under guide roll 280 and up against the vertical left side of the shell slightly beyond the vertical center thereof. These web portions have been pressed in position either by hand or by the operation of pressing head 180, rolls 205, and the bottom margins M have been turned in and pressed by the devices 208, leaving the top or open end margins $M^1$ projecting. The cutters 300 have pricked through these margins at the corners. An uncovered shell $S^2$ is placed on the form $9^b$ and the turning-bar 7 is rotated on its axis 4, one-half turn in the manner indicated in Fig. 12, to the position of Fig. 13. The forms are rotated in a fixed, curved path or orbit, usually circular, since it is convenient to move them about the fixed center or axis indicated by shaft 4, and there is no need for lateral translation of the common form support or of the individual forms, or of any movement other than a fixed orbital or circular movement, because the devices employed for operating on the forms or the cover paper at their fixed positions are all retracted after such operations and so positioned as not to interfere with the described movement. In the stated rotation by which the shell $S^1$ is transferred to station B, while shell $S^2$ is transferred to station A, the cover web P is drawn off of roll R and glued, and under roll 280, and then is laid against the end of shell $S^1$, which was the bottom end and now becomes the upper end in further rotation, against the upper end of shell $S^2$, and against the outer vertical face of the latter, leaving the continuous web portion $P^1$ extending across the space between the upper ends of the shells, Fig. 13. Cover paper has thus been applied to three walls of shell $S^1$ and two walls of shell $S^2$. In the rotation of the forms, the web $P^1$ was laid across or upon the fixed knife 66 while the movable cutter 67 was retracted. This cutter (or any other suitable cutting appliance) is then applied to sever the web $P^1$ as in Fig. 14. The pressing and turning devices are then applied, as in Fig. 14. They first roll down the severed web portions $P^1$ on the upper portions of the inner vertical faces of the shells, while also rolling and pressing other web portions on the outward shell faces, and turn and press the upper projecting bottom cover margin and the upper halves of the side wall projecting bottom margins. The covering of the shell $S^1$ at station B is thus completed while the covering of the shell $S^2$ at station A is substantially one-half completed. After the pressing devices are withdrawn upward the ejectors 150 or other suitable devices are applied to eject the shell $S^1$ from its form, and in this movement the cutters 300 slit the projecting top cover margins at the corners. The ejected shell is then in the condition of Fig. 16, ready for the turning and affixing of the top margins on inner marginal faces of the shell walls, as shown in Fig. 17, which represents the finished box in section.

It will thus be understood that an important feature of the invention either as to the process or the machine, is the performance of covering operations simultaneously at two stations with the completion of substantially one-half of the complete cover application at each station, or in other words, the practical completion of one-half of a covered box at each station, and the transfer of the boxes successively from a first to a second station so that the half-covering operation at the second station completes the box at that point. This may be done either with the present machine or other suitable machines or with rudimentary appliances, sufficiently exemplified in Figs. 11 to 15, by movement of the shells or their supporting forms in a fixed orbit or about a common fixed center, and without other shifting movements, for reasons explained above. So far as the operations of the machine are concerned, the service of only one attendant is required, namely, that of an operator to place the uncovered shells on the form at station B after the completed box has been ejected therefrom. The result is great rapidity of operations with correspondingly high output and economy, and a high-class product, with unskilled labor.

I claim:

1. A method of covering boxes or similar articles comprising supporting two box shells for covering, and applying a continuous web of cover paper to outer faces of the two shells by simultaneous movement thereof in a fixed orbit.

2. A method of covering boxes or similar articles comprising supporting two box shells for covering, and applying a continuous web of cover paper to outer faces of the two shells by simultaneous movement thereof in a fixed circular path.

3. A method of covering boxes or similar articles comprising supporting two box shells for covering, and applying a continuous web of cover paper to outer faces of the two shells by simultaneous movement thereof about a fixed center.

4. A method of covering box shells and similar articles comprising supporting two shells on forms for covering, applying a continuous web of cover paper to outer surfaces of the shells by rotative movement of the shells about an intermediate center, and pressing and affixing the cover paper to the two shells simultaneously.

5. A method of covering box shells and similar articles comprising supporting two shells on forms for covering, applying a continuous web of cover paper to outer surfaces of the shells by rotative movement of the shells about an intermediate fixed center, and pressing and affixing the cover paper to the two shells simultaneously so that substantially one-half of each of the two shells is covered and by the successive positioning of the shells the half-covering operations on one of them produce the complete covering thereof.

6. A process of covering box shells and like articles comprising supporting two shells for covering, applying a continuous web of cover paper to outer faces of the shells by simultaneous rotative movement thereof in a fixed orbit, with a continuous portion of the cover web extending across and between two aligned shell faces, severing said web portion between the shells, and turning down and affixing the severed portions to inner shell faces while simultaneously pressing other portions of the cover web on other faces of the shells.

7. A process of covering box shells and like articles, comprising supporting two shells for covering, applying a continuous web of cover paper to outer faces of the shells by simultaneous rotative movement thereof in a fixed orbit, with a continuous portion of the cover web extending across and between two aligned shell faces, severing said web portion between the shells, and turning down and affixing the severed portions to inner shell faces while simultaneously pressing other portions of the cover web on other faces of the shells with the simultaneous completion of substantially one-half of the covering operations on one shell and the entire completion of the operations on the other shell.

8. A method of covering box shells and similar articles, comprising supporting two shells on forms for covering, applying a continuous web of cover paper to outer surfaces of the shells by rotative movement of the shells about an intermediate fixed center, with margins of the cover projecting beyond the shell, pressing and affixing the cover paper to the shells, and turning and affixing certain cover margins to adjacent shell surfaces.

9. A method of covering box shells and similar articles, comprising supporting two shells on forms for covering, applying a continuous web of cover paper to outer surfaces of the shells by rotative movement of the shells about an intermediate fixed center with margins of the cover paper projecting beyond the shell walls for application to the shell bottom, pressing and affixing the cover paper to the shell walls simultaneously, and turning and affixing the projecting cover margins to marginal surfaces of the shell bottom.

10. A method of covering box shells and similar articles, comprising supporting two shells on forms for covering, applying a continuous web of cover paper to outer surfaces of the shells by rotative movement of the shells about an intermediate fixed center, with margins of the cover projecting beyond the shell, pressing and affixing the cover paper to the shells, and turning and affixing certain cover margins to adjacent shell surfaces, the described cover affixing and margin-turning operations being regulated to finish substantially one-half of the cover and margin-affixing operations for each shell substantially simultaneously.

11. Mechanism for strip covering box shells or the like, comprising means for supporting two box shells for covering, and means for applying a continuous web of cover paper to outer faces of the shells by simultaneous rotary movement thereof about a common fixed intermediate center.

12. Mechanism for strip covering box shells or the like, comprising means for supporting two box shells for covering, and means for applying a continuous web of cover paper to outer faces of the shells by simultaneous movement thereof about an intermediate fixed center.

13. Mechanism for strip-covering box shells and the like, comprising a form support arranged to turn on a fixed axis, forms carried by the support, one at each side of the axis, means for turning the support intermittently, means for supplying a web of cover paper which is applied to outward surfaces of shells on the supports by the turning action, and means at relatively fixed stations for pressing and securing portions of the cover paper on end and side walls of the shells substantially simultaneously.

14. Mechanism for strip-covering box shells and the like, comprising a form support arranged to turn on a fixed axis, forms carried by the support, one at each side of the axis, means for turning the support intermittently, means for supplying a web of cover paper which is applied to outward surfaces of shells on the supports by the turning action, means for severing a portion of the cover web extending between the shells, and means at relatively fixed stations for pressing and securing the severed web portions to inward faces of the shells and other web portions to end and outward wall surfaces of the shells.

15. Mechanism of the class described comprising a form support, means for turning it, at least two forms on the support, means for supplying cover paper to shells carried by the forms by rotative movement of the support and with margins of the cover paper projecting beyond the shells, and means at relatively fixed stations for turning and securing the projecting margins to adjacent surfaces of the shells.

16. In mechanism of the class described, a rotary form support, box shell forms thereon, cutters carried by the support, an operating connection for the cutters, and means at a relatively fixed position for operating the cutters simultaneously when the support and the cutter connecting means are definitely located in relation to said operating means.

17. In mechanism of the class described, a rotary form support, box shell forms thereon, cutters carried by the support, an operating connection for the cutters, an overthrow device co-operating with said connection to complete movement of the cutters in either direction after they pass a central position, and means at a relatively fixed position for operating the cutters simultaneously when the support and the cutter connecting means are definitely located in relation to said operating means.

18. In mechanism of the class described, a rotary form support, forms thereon, and cover paper pressing and manipulating means movably located at relatively fixed stations, said means comprising a presser located at each of the stations.

19. In mechanism of the class described, a rotary form support, forms thereon, and cover paper pressing and manipulating means movably located at relatively fixed stations, said means comprising a presser located at each of the stations, and a cover margin turning device located at each station.

20. In mechanism of the class described, a rotary form support, forms thereon, and cover paper pressing and manipulating means movably located at relatively fixed stations, said means comprising an upper cover margin turning and pressing device, and side margin turning and pressing device located at each station.

21. Box covering mechanism comprising a frame, a form-support arranged to rotate on a fixed axis, two forms on the support in fixed radial relation to said axis, and means for simultaneously performing covering operations with relation to the two forms.

22. Box covering mechanism comprising a frame, a form-support arranged to rotate on a fixed axis, two forms on the support in fixed radial relation to said axis, and means for simultaneously performing covering operations with relation to the two forms while they are held at fixed positions.

23. Box covering mechanism comprising a frame, a form-support arranged to rotate on a fixed axis, means for rotating the support intermittently, two forms on the support at opposite sides of said axis and in fixed radial relation thereto, and means for simultaneously performing covering operations with relation to the two forms.

24. Box covering mechanism comprising a frame, a form-support arranged to rotate on a fixed axis, means for rotating the support intermittently, one half turn at each operation, two forms on the support in fixed radial relation to said axis, and means for simultaneously performing covering operations with relation to the two forms.

25. Box covering mechanism comprising a frame, a form-support arranged to rotate on a fixed axis, two forms on the support at opposite sides of said axis and in fixed radial relation thereto, means for simultaneously performing covering operations with relation to the two forms, and means for registering and holding the support in fixed position.

26. Box covering mechanism comprising a frame, a form-support arranged to rotate on a fixed axis, two forms on the support, means for simultaneously performing covering operations with relation to the two forms, means for registering and holding said support in fixed position, and means for retracting said holding means previous to a turning action.

27. Box covering mechanism comprising a frame, a shaft in fixed bearings thereon, a turning bar on the shaft, two box shell forms on the bar, means for rotating the bar intermittently, a half-turn at each action, cover applying means at each of two fixed stations, and means for automatically advancing and retracting said means to co-operate with box shells positioned at the stations.

28. Box covering mechanism comprising a frame, a shaft in fixed bearings thereon, a turning bar on the shaft, two box shell forms on the bar, means for rotating the bar intermittently, a half-turn at each action, cover applying means at each of two fixed stations, means for automatically advancing and retracting said means to co-operate with box shells positioned at the stations, and cover-web-severing means mounted for movement with the forms.

29. Box covering mechanism comprising a frame, a shaft in fixed bearings thereon, a turning bar on the shaft, two box shell forms on the bar, means for rotating the bar intermittently, a half-turn at each action, cover applying means at each of two fixed stations, means for automatically advancing and retracting said means to co-operate with box shells positioned at the stations, cover-web-severing means mounted for movement with the forms, and means for operating the severing means to sever a cover web extending between the shells.

30. Box covering mechanism comprising a frame, a shaft in fixed bearings thereon, a turning-bar on the shaft, two box shell forms on the bar, means for rotating the bar intermittently, a half-turn at each action, cover-applying means at each of two fixed stations, means for automatically advancing and retracting said means to co-operate with box shells positioned at the stations, cover-web-severing means mounted for movement with the forms, and relatively-fixed operating means for actuating said severing means.

31. A covering machine comprising a form, adapted to support a box shell or similar article to receive cover material, and cutters located adjacent corners of the form to slit projecting cover material.

32. A covering machine comprising a form adapted to support a box shell or similar article to receive cover material, and cutters located adjacent corners of the form and acting upon movement of the covered shell in relation to the form to slit projecting cover margin material near the corners thereof and so to produce independent flaps for turning in.

33. In covering mechanism, a form adapted to receive a box shell or like article for covering, and cutters mounted on the form near the corners thereof and adapted to pierce a projecting margin of cover material laid about the form and to slit the cover material and produce independent flaps therein when the shell is removed from the form.

34. Covering mechanism comprising a form support, forms thereon, means for rotating the support, and cover margin slitters located adjacent the corners of the forms to pierce and slit a projecting cover margin and produce independent turn-in-flaps therein.

35. Covering mechanism comprising a form support, forms thereon, means for rotating the support, and cover margin slitters located on the forms near the corners thereof to pierce and slit a projecting cover margin and produce independent turn-in-flaps therein.

36. In a covering machine, a movable form-support, a plurality of forms adjustably mounted thereon, means for moving the support, means at relatively fixed stations for operating on the cover paper applied to box shells or the like carried by the forms, and means acting automatically to eject a shell from the form at one of the stations.

37. A covering machine comprising a rotatable form-support, shell forms thereon, primary driving mechanism, means operated by the driving mechanism for rotating and stopping the form-support, mechanisms adapted to operate with relation to the forms at relatively fixed stations, means by which said driving mechanism also impels said mechanisms, and automatic stopping means acting after said operations to prevent renewed driving of the form support.

38. A covering machine comprising a rotatable form-support, shell forms thereon, primary driving mechanism, means operated by the driving mechanism for rotating and stopping the form-support, mechanisms adapted to operate with relation to the forms at relatively fixed stations, means by which said driving mechanism also impels said mechanisms, automatic stopping means acting after said operations to prevent renewed driving of the form-support, and arbitrarily-operated means for causing resumption of operations.

39. A covering machine comprising a rotatable form-support, shell forms thereon, primary driving mechanism including a clutch, means operated by the driving mechanism for rotating and stopping the form support, mechanisms adapted to operate with relation to the forms at relatively fixed stations, means by which said driving mechanism also impels said mechanisms, and automatic stopping means acting after said operations to release the clutch and prevent renewed driving of the form support.

40. A covering machine comprising a rotatable form-support, shell forms thereon, primary driving mechanism including a clutch, means operated by the driving mechanism for rotating and stopping the form support, mechanisms adapted to operate with relation to the forms at relatively fixed stations, means by which said driving mechanism also impels said mechanisms, automatic stopping means acting after said operations to release the clutch and prevent renewed driving of the form support, and arbitrarily operated means for reengaging the clutch to resume the cycle of operations.

41. Covering mechanism comprising a covering machine having a rotary form support and shell forms thereon, means for applying a web of material, such as cover paper, for application to shells or the like, on the rotating forms, and means for relatively adjusting the forms and said web-supply means to control the application of the web to the shells.

42. Covering mechanism comprising a covering machine having a rotary form support and shell forms thereon, means for applying a web of material, such as cover paper, for application to shells or the like on the rotating forms, and means for adjusting the place of movement of the forms in relation to said web-supply means.

43. Covering mechanism comprising a covering machine having a rotary form support and shell forms thereon, means for applying a web of material, such as cover paper, for application to shells or the like on the rotating forms, and means for adjusting the main machine in relation to the web supply means to regulate the application of the web to the forms.

44. Covering mechanism comprising a covering machine, having a rotary form support, and shell forms thereon, and gluing mechanism arranged to supply adhesive to a web of cover paper or the like advancing for application to the forms, said gluing mechanism and forms being relatively adjustable to control the length of the web between the gluing mechanism and forms.

45. Covering mechanism comprising a covering machine having a rotary form support and shell forms thereon, and gluing mechanism arranged to glue a web of cover paper or the like advancing substantially in the plane of the forms, the gluing mechanism being arranged for movement toward and from the forms to regulate the length of the glued web.

46. A method of covering box shells and similar articles, comprising supporting two shells on forms for covering, applying a continuous web of cover paper to outer faces of the shells by rotative movement thereof, and pressing and affixing the cover paper to substantially one-half of each of the two shells simultaneously, equalling the production of one completely-covered shell.

47. A method of covering box shells and similar articles, comprising supporting two shells on forms for covering, applying a continuous web of cover paper to outer surfaces of the shells by rotative movement of the shells in a fixed orbit, and pressing and affixing cover paper to the two shells simultaneously so that substantially one-half of each shell is covered, equalling the production of one complete-covered shell in each cycle.

Signed at New York City in the county of New York and State of New York this 23rd day of Sept. A. D. 1925.

HARRY BRIDGMAN SMITH.